(12) United States Patent
Fuse et al.

(10) Patent No.: US 6,947,827 B2
(45) Date of Patent: Sep. 20, 2005

(54) ENGINE IDLE STOP CONTROL SYSTEM FOR VEHICLES

(75) Inventors: Toru Fuse, Zama (JP); Takashi Nakazawa, Kawasaki (JP); Hatsuo Nagaishi, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 123 days.

(21) Appl. No.: 09/980,162

(22) PCT Filed: Mar. 30, 2001

(86) PCT No.: PCT/JP01/02826

§ 371 (c)(1),
(2), (4) Date: Nov. 30, 2001

(87) PCT Pub. No.: WO01/77519

PCT Pub. Date: Oct. 18, 2001

(65) Prior Publication Data

US 2002/0107632 A1 Aug. 8, 2002

(30) Foreign Application Priority Data

Apr. 12, 2000 (JP) ......................................... 2000-110424

(51) Int. Cl.$^7$ .............................................. F02N 11/08
(52) U.S. Cl. ..................... 701/110; 701/113; 123/179.4
(58) Field of Search ................................ 701/110, 112, 701/113; 123/179.4

(56) References Cited

U.S. PATENT DOCUMENTS

| 5,865,263 A | * | 2/1999 | Yamaguchi et al. ........ 180/65.2 |
| 5,934,395 A | * | 8/1999 | Koide et al. ................ 180/65.2 |
| 6,019,183 A | * | 2/2000 | Shimasaki et al. .......... 180/165 |

FOREIGN PATENT DOCUMENTS

| EP | 0989299 | 3/2000 | |
| JP | 8-193531 | 7/1996 | |
| JP | 8-232817 | * 9/1996 | ........... F02N/11/04 |
| JP | 08-291725 | 11/1996 | |
| JP | 10-325345 | 12/1998 | |

* cited by examiner

Primary Examiner—Andrew M. Dolinar
(74) Attorney, Agent, or Firm—McDermott Will & Emery LLP

(57) ABSTRACT

An engine 1 is stopped according to conditions when a vehicle has stopped, and the engine 1 is started by starting a motor/generator 2 when a request to restart the engine 1 which has stopped, is determined. Engine torque is absorbed by the motor/generator 2 so that that the starting torque according to an accelerator pedal depression after restart, is effectively the same torque for starting from the engine stop state as for starting from the engine idle state. In this way, the same starting performance is obtained when the vehicle starts from the engine stop state as when the vehicle starts from the engine idle rotation state.

8 Claims, 13 Drawing Sheets

(a)

(b)

(a)

(b)

ENGINE IDLE STOP CONTROL SYSTEM FOR VEHICLES

FIELD OF THE INVENTION

The present invention relates to an engine idle stop control system for vehicles.

BACKGROUND OF THE INVENTION

JP8-291725A discloses a vehicle provided with an automatic engine idle stop control system wherein the engine is automatically stopped and restarted according to the conditions when the vehicle stops.

This system stops the engine automatically when the vehicle is stopped to wait for a traffic signal, etc., and automatically starts it again when the vehicle starts, in order to improve fuel-cost performance, exhaust gas and noise, etc., during a stop.

SUMMARY OF THE INVENTION

However, in this engine idle stop control system, idle rotation may be performed without stopping the engine depending on the conditions during the vehicle stop. For this reason, when an accelerator is depressed and a vehicle which had stopped is restarted, the vehicle may start from when the engine has stopped or from when the engine is in the idle rotation state.

When the engine starts from the idle rotation state, even if the degree of opening of the throttle valve is same, the engine boost is large, and as a response delay appears in the increase in the actual amount of air intake to the cylinder, the torque generated is lower than when the engine starts from the stop state. For this reason, the start performances of vehicles differ.

It is therefore an object of this invention to equalize, as far as possible, the engine torque characteristics obtained when the engine starts from the idle state and when the engine starts from the engine stop state, during a vehicle start.

In order to achieve the above object the present invention provides an engine idle stop control system for a vehicle which comprises an engine, a motor/generator connected to the engine, an automatic transmission which transmits the rotation of the engine to a drive wheel, a sensor which detects a vehicle stationary state, a sensor which detects an accelerator pedal depression amount, and a microprocessor. The microprocessor is programmed to stop the engine according to conditions when the vehicle has been stationary, to restart the engine by starting the motor/generator when a request to restart the engine which has stopped when a request to restart the engine which has stopped, is determined, and to control absorption of torque by the motor/generator so that the starting torque according to an accelerator pedal depression after restart, is effectively the same torque for starting from the engine stop state as for starting from the engine idle rotation state.

The details as well as other features and advantages of the invention are set forth in the remainder of the specification and are shown in the accompanying drawings.

DESCRIPTION OF THE PREFERRED EMBODIMENTS

Figure 1:
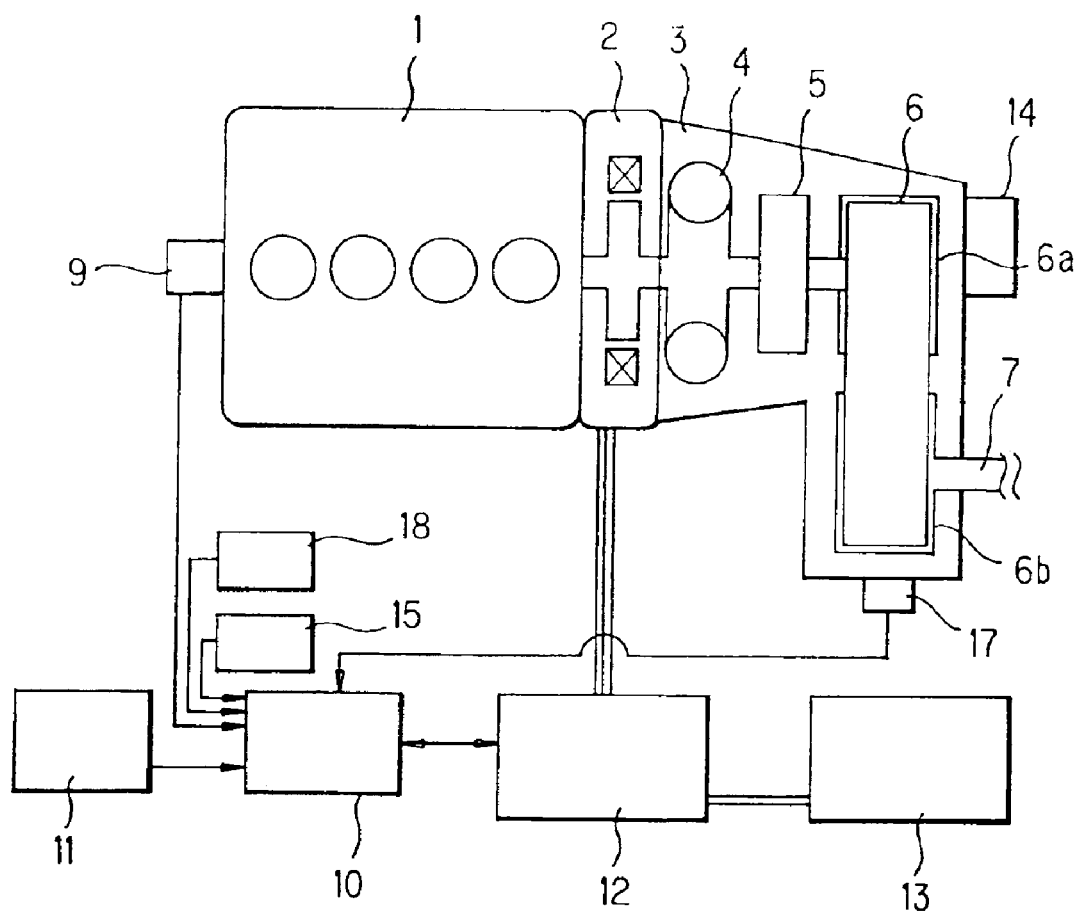
FIG. 1 is a system diagram of a hybrid vehicle according to a first embodiment of this invention.

This invention will now be described referring to the drawings.

FIG. 1 shows the construction of a hybrid vehicle.

In FIG. 1, 1 is an engine, 3 is a continuously variable transmission, and a motor/generator 2 is interposed between this engine 1 and the continuously variable transmission 3. The rotation of the engine 1 or motor/generator 2 is transmitted to drive wheels, not shown, from the continuously variable transmission 3 via a drive shaft 7.

Instead of the continuously variable transmission 3, a stepwise automatic transmission with torque converter or a start clutch can also be used.

The continuously variable transmission 3 is equipped with a torque converter 4 and a forward/reverse change-over mechanism 5. The continuously variable transmission 3 comprises variable pulleys 6a, 6b and a metal belt 6 looped around these pulleys. A speed ratio transmitted via the metal belt 6 is varied by changing the groove width, i.e., the pulley ratio, of the variable pulleys 6a, 6b.

A target speed ratio of the continuously variable transmission 3 is set according to running conditions, and the oil pressure supplied to a primary and secondary cylinder which drives the variable pulleys 6a, 6b is controlled so that this ratio coincides with a ratio of a real input rotation speed and output rotation speed. 14 is an oil pump driven by an electric motor which can generate oil pressure also during a temporary stop of engine rotation, and supply oil pressure required for the continuously variable transmission 3.

The forward/reverse change-over mechanism 5 changes over the rotation direction of the output shaft when the vehicle is moving forward and reversing. The torque converter 4 also transmits the input rotation torque to the output side via a hydrodynamic force, and allows the rotation on the output side to stop when, for example, the rotation on the input side is very small.

The motor/generator 2 is directly connected, or connected via a belt and chain, to the crankshaft of the engine 1, and rotates in synchronism with the engine 1. The motor/generator 2 functions as a motor or as a generator, and its function, rotation speed and generation amount are controlled by a power control unit 12.

When the engine 1 starts, or when assisting the output of the engine 1, the motor/generator 2 functions as a motor, in which case a current from a very powerful battery (42V battery) 13 is supplied via a power control unit 12. When the running energy of the vehicle is recovered such as when the vehicle is decelerating, it functions as a generator, and in this case the battery 13 is charged by the generated power.

To stop the engine 1 automatically, and then restart the engine 1 automatically depending on conditions such as the temporary stop of the vehicle, an automatic idle stop control unit 10 is provided.

This automatic idle stop control unit 10, which is linked to an engine control unit 20 (FIG. 2), stops the operation of the engine 1 when the vehicle stops, and starts the engine 1 by the motor/generator 2 when the vehicle starts.

Signals are input to the automatic idle stop control unit 10 from a rotation speed sensor 9 which detects the engine rotation speed, a brake sensor 11 which detects a brake operation by a brake pedal 16, an accelerator sensor 15 which detects an accelerator depression by an accelerator pedal 17, a select position sensor 17 which detects a select position of the continuously variable transmission 3, and a vehicle speed sensor 18 which detects a vehicle speed. The conditions under which the vehicle stops are determined based on these signals, and automatic stop and start control of the engine 1 is performed accordingly. The details of this control will be described later.

Figure 2:
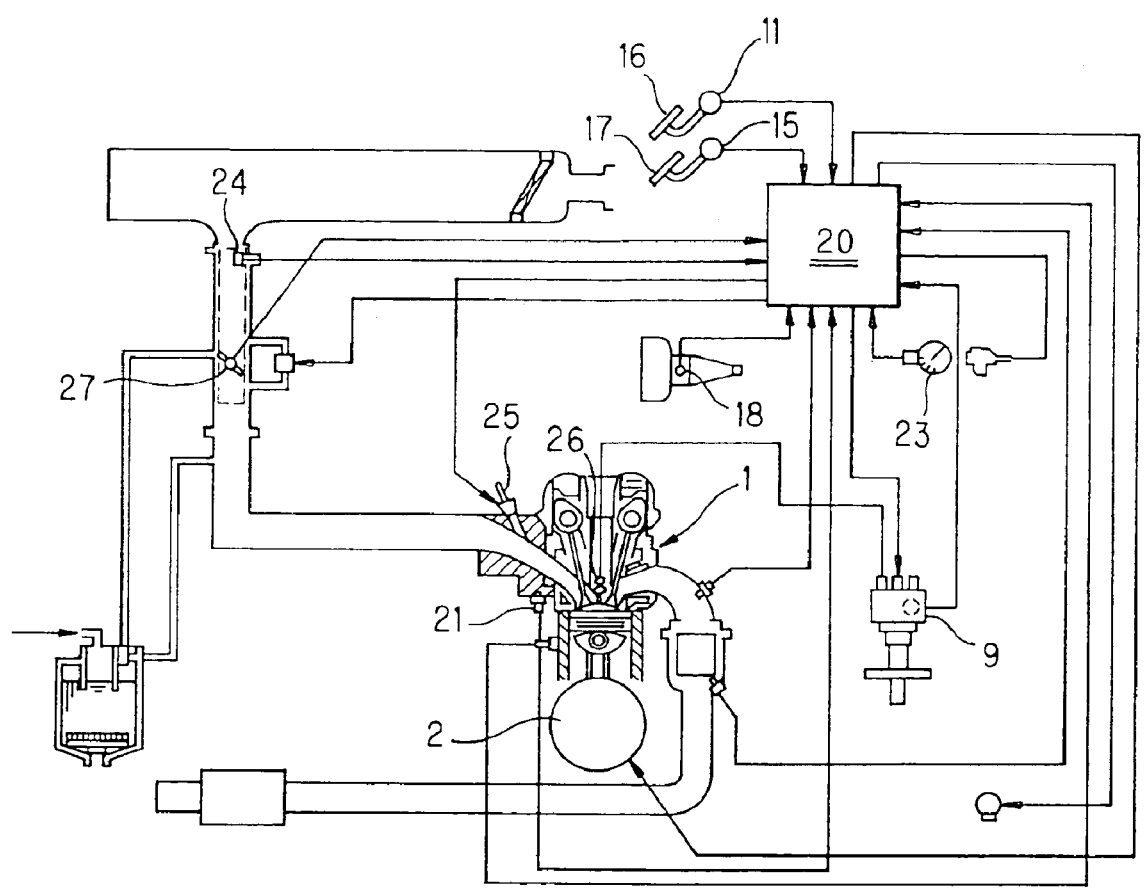
FIG. 2 is a system diagram of an engine.

The engine control unit 20 shown in FIG. 2 controls an intake air amount by adjusting the opening of a throttle valve 27 provided in an intake air passage 22 which is electronically controlled, a fuel injection amount of a fuel injector 25 provided in each cylinder of the engine 1, and an ignition timing of a spark plug 26.

The engine control unit 20 computes an optimum target engine torque based on the accelerator pedal depression amount from the accelerator opening sensor 15, and the engine rotation speed from the engine rotation speed sensor 9. The opening of the throttle valve 27 which is driven by a throttle actuator is determined and the intake air amount is controlled so that this target engine torque is obtained.

The engine control unit 20 also computes a fuel amount suitable for the intake air amount and an ignition timing suited to the engine load and engine rotation speed based on signals from the rotation speed sensor 9, air flow meter 24 which detects the intake air amount provided in the intake air passage 22 and water temperature sensor 21 which detects the engine cooling water temperature, and controls the fuel injection amount of the fuel injector 25 which supplies fuel to the engine 1 and the ignition timing of the spark plug 26.

Fuel may also be directly injected into the combustion chambers from the fuel injector 25.

Here, the control of the fuel injection amount will be described.

First, a basic injection pulse width TPO of a fuel injection pulse signal is computed by the following equation:

$$TPO = K \times Qa/Ne \qquad (1)$$

where:
Qa=intake air flowrate obtained by the air flow meter
Ne=engine rotation speed
K=constant An injection pulse width TP equivalent to the real cylinder air amount is then computed by the following equation based on the basic injection pulse width TPO including a response delay of the intake air system.

$$TP = TPO \times FLOAD + TPz \times (1-FLOAD) \qquad (2)$$

where:
Tpz=immediately preceding value of TP
FLOAD=weighted average coefficient

The weighted average coefficient FLOAD corresponds to a time constant in the response delay of the intake air system.

Next, a fuel injection pulse width Ti [ms] is computed from the following equation so as to obtain a target air fuel ratio based on this cylinder air amount equivalent injection pulse width TP.

$$Ti = TP \times Tfbya(\alpha + \alpha m - 1) \times 2 + Ts \qquad (3)$$

where:
α=air fuel ratio feedback correction coefficient
αm=air fuel ratio learning value
Ts=ineffectual injection pulse width
α is computed based on the exhaust air-fuel ratio detected by an exhaust gas sensor 32 provided in an engine exhaust passage 31.

The fuel injector 25 opens for a time corresponding to this fuel injection pulse width Ti, and injects fuel according to the ignition sequence for each cylinder each time the engine rotates twice.

Figure 3:
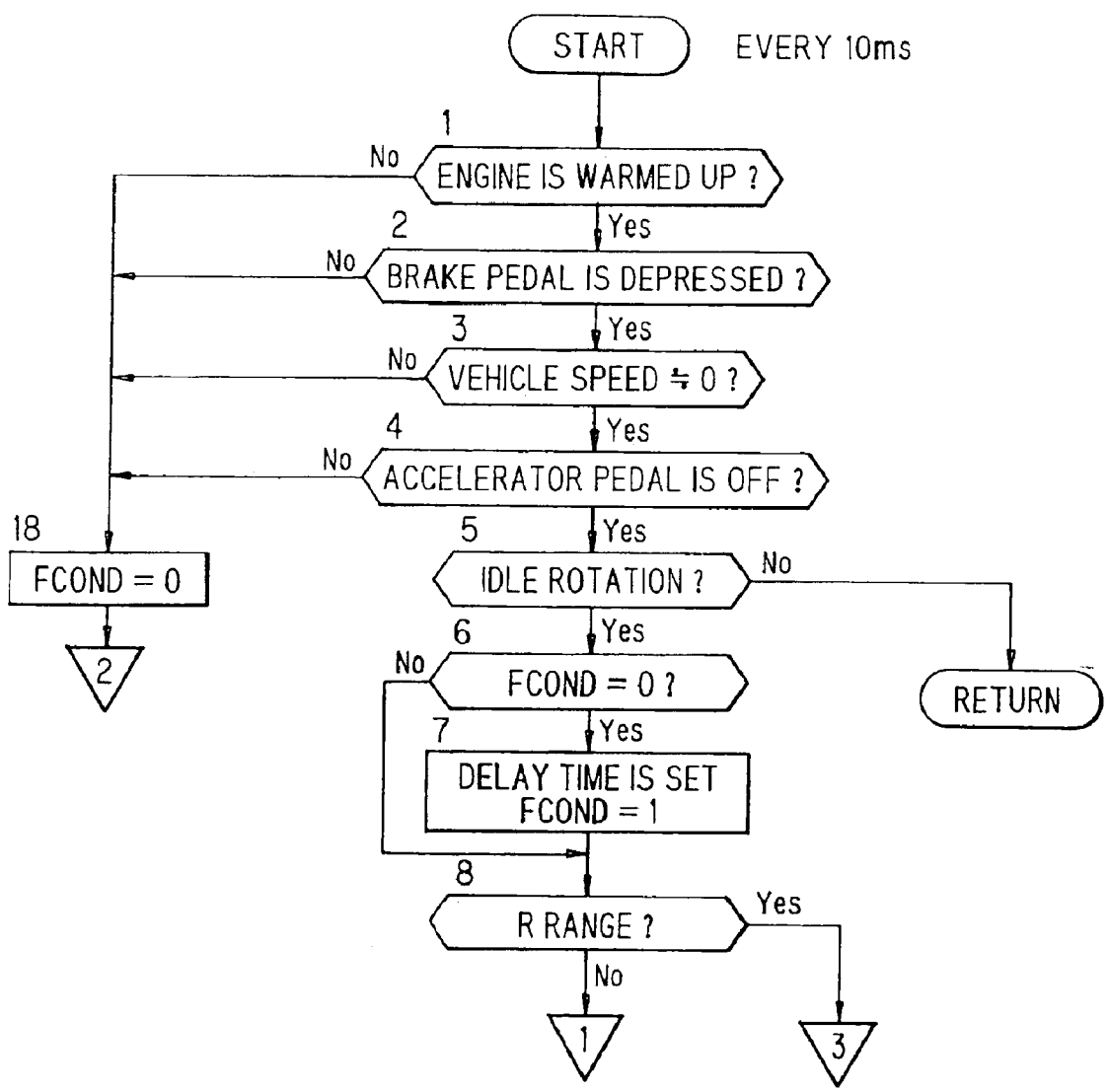
FIG. 3 is a flowchart showing an automatic idle stop control operation performed by an automatic stop/start control unit.
Figure 4:
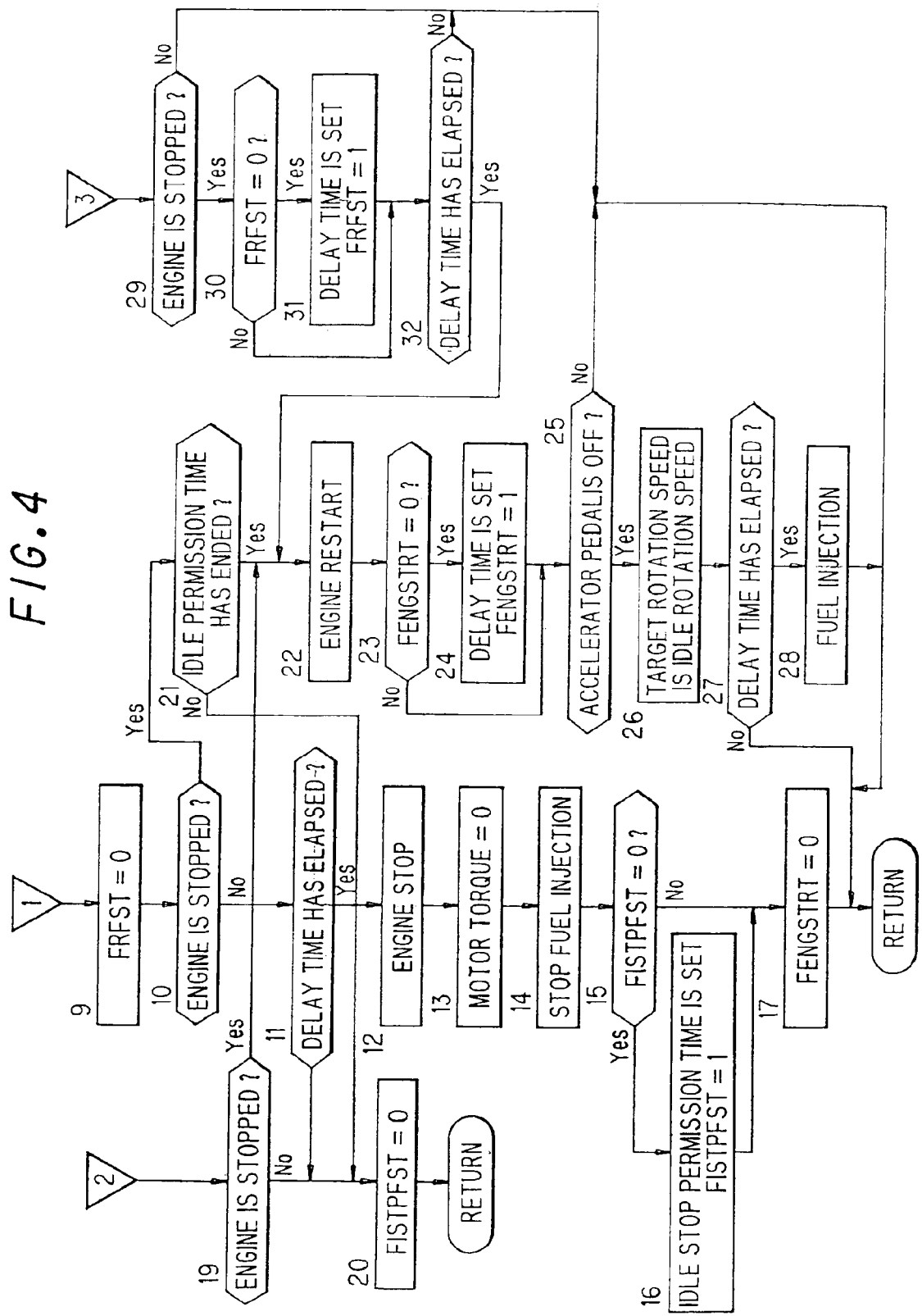
FIG. 4 is a flowchart showing an automatic idle stop control operation performed by the automatic stop/start control unit.

Next, the automatic idle stop control performed by the aforesaid automatic idle stop control unit 10 will be described referring to the flowcharts of FIG. 3 and FIG. 4.

Automatic idle stop control is performed after the engine warms up. In this control, the engine stops operating when, for example, the vehicle stops temporarily at a crossing according to the conditions at that time, and automatically restarts when the vehicle starts.

In a step S1, when it is determined that the engine is completely warmed up, it is determined in steps S2–S6 whether or not the brake pedal is depressed, the vehicle speed is 0, the accelerator pedal is OFF, and the engine rotation speed is an idle rotation (e.g., 800 rpm or less). When all these conditions are satisfied, the routine proceeds to the step S6, and it is determined whether or not these conditions are satisfied for the first time by determining whether or not a temporary stop permission flag FCOND=0.

When this flag FCOND=1, it indicates that the temporary stop permission condition of the engine 1 is satisfied, and when FCOND=0, it indicates that the temporary stop permission condition is not satisfied.

If FCOND=0 when the routine proceeds from the step S5 to the step S6, it is considered that the aforesaid conditions hold for the first time, and the routine proceeds to a step S7. Here, a delay time until the engine 1 stops is set, and the temporary stop permission flag FCOND is set to 1. The delay time may be set to, e.g., approximately 2 seconds, so the engine 1 stops approximately 2 seconds after the temporary stop permission flag is satisfied.

Next, a select position of the continuously variable transmission is detected in a step S8. If the position is not the R range, the system shifts to automatic stop, the routine proceeds to a step S9, and a flag used for the R range is reset (FRFST=0). In a step S10, it is determined whether or not the engine has already stopped.

In addition to the D range, this automatic stop and restart is performed in the L and S ranges, or N and P (neutral and parking) ranges.

If the engine has not stopped, the routine proceeds to a step S11, it is determined whether or not the delay time set above has elapsed, and if the delay time has elapsed, the routine proceeds to an engine stop mode in a step S12 and subsequent steps.

In this engine stop mode, in order to stop the engine temporarily, the torque generated by the motor/generator 2 is set to 0 in a step S13, and engine fuel injection is stopped in a step S14.

In a step S15, it is determined whether or not engine stop is being performed for the first time from whether or not FISTPFST=0. If it is the first time, the routine proceeds to a step S16, an idle stop permission time is set, and a flag showing the time setting is set to FISTPFST=1. Further, in a step S17, a flag FENGSTRT showing that the engine 1 has stopped automatically is reset to 0, whence engine stop begins.

On the other hand, when any of the conditions of the aforesaid steps S1–S4 is not satisfied, i.e., when the brake pedal is released, the accelerator pedal is depressed or the vehicle speed is no longer 0, it shows that the temporary stop permission condition of the engine 1 does not hold. Therefore, the routine proceeds to a step S18, the temporary stop permission flag FCOND is set to 0, and in a step S19, it is determined whether or not the engine has stopped. If it has stopped, the routine proceeds to a step S22 and subsequent steps, and the engine 1 is restarted.

If the engine has not stopped, in a step S20, the idle stop permission flag FISTPFST is reset to 0.

When the temporary stop permission condition of the engine 1 is satisfied, and it is determined in the step S10 that there has already been a shift to engine stop, the routine proceeds to a step S21 where it is determined whether or not the idle stop permission time has ended. If this permission time has elapsed, the system enters an engine restart mode of the step S22 and subsequent steps.

When the engine is restarted, the system first shifts to the engine restart mode in the step S22, and it is determined whether engine restart is being performed for the first time in a step S23 from FENGSTRT=0. If this is the first time it is being performed, a restart delay time is set and FENGSTRT=1 in a step S24.

This delay time is set to a time corresponding to a boost developing time (e.g., 1.5 seconds) when there is a restart. During this interval, cranking is performed without fuel injection, and the engine is started smoothly.

If the engine is started when the accelerator pedal is OFF, i.e., the accelerator is not depressed in the step S25, an idle rotation speed which is a target engine rotation speed is set in a step S26, a delay time is allowed to elapse in a step S27, and fuel injection is started in a step S28.

If the engine is started when the accelerator pedal is depressed in the step S25, the routine proceeds to the step S28, and fuel injection begins immediately.

On the other hand, when it is determined that the select position of the continuously variable transmission is the R range in the step S8, it is determined whether or not the engine 1 has stopped in the step S29. If it has stopped, the routine proceeds to a step S30, and it is determined whether or not this is the first occasion of shifting from another range to the R range from the flag which is reset in the step S9, i.e., if FRFST=0, it is determined that this is the first occasion of shifting to the R range. The routine then proceeds to a step S31, a delay time (e.g., 2 seconds) during which the engine 1 stops is set, and the flag FRFST is set to 1.

In a step S32, when the set delay time has elapsed, the routine proceeds to the step S22 and subsequent steps, and the engine 1 is started.

However, the engine starting torque is different depending on whether the engine is started from an idle stop state and the vehicle is started according to the accelerator pedal depression, or whether the vehicle is started from the state where there is idle rotation without stopping the engine even if the vehicle has stopped.

This is because the boost of the intake air system immediately prior to accelerator pedal depression is different. The intake air amount aspirated by the engine is larger by the amount that the boost is smaller when the vehicle is started from the engine stop state, and the starting torque is therefore larger even if the accelerator depression amount is the same.

To prevent this difference of starting torque, according to this invention, when the vehicle starts from the engine stop state, control is performed so that the motor/generator 2 generates power (regeneration), part of the torque generated by the engine is absorbed, and the same starting torque is obtained as when the vehicle starts from the idle rotation state.

This control will be described referring to the flowchart of FIG. 8 and subsequent figures.

Figure 8:
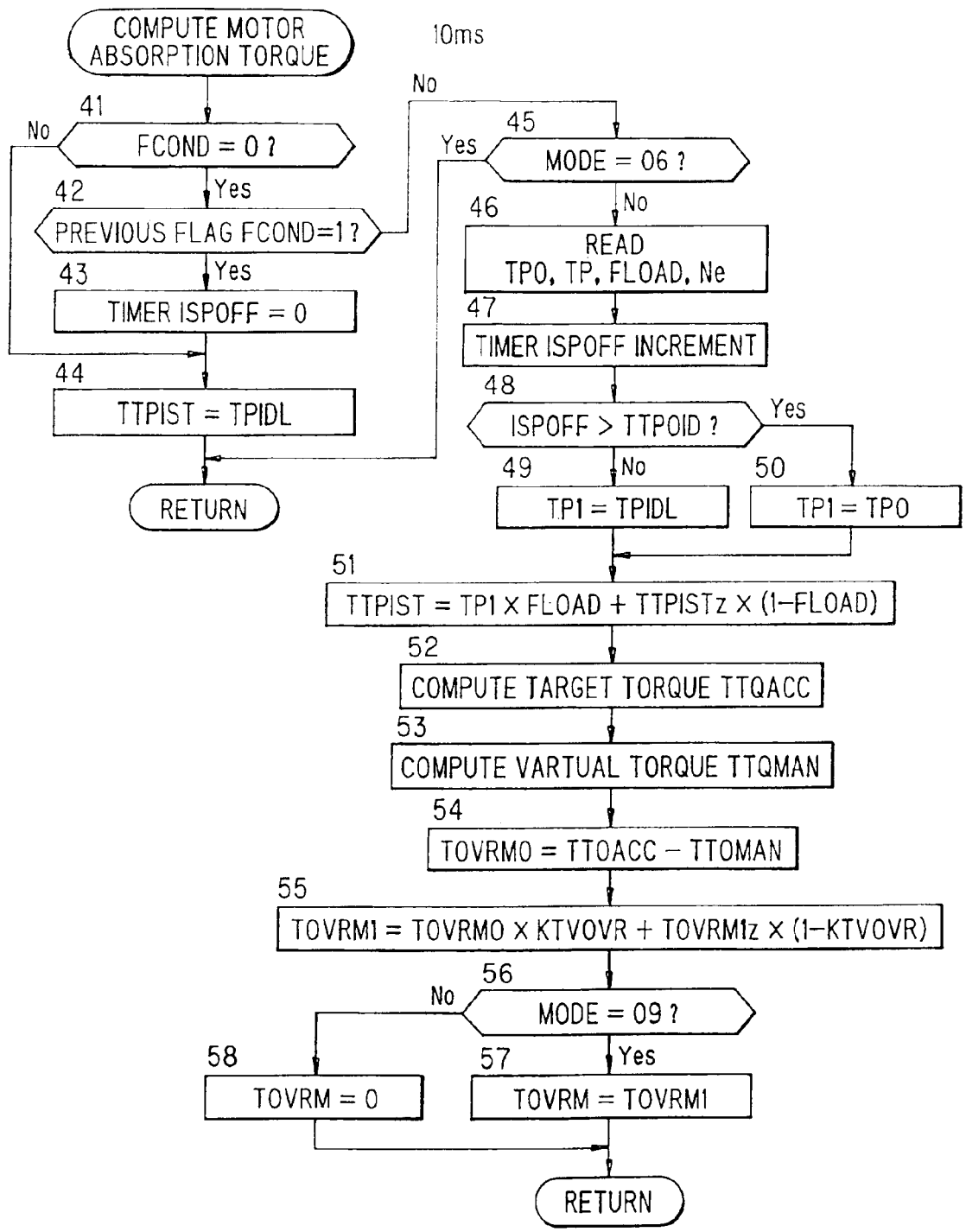
FIG. 8 is a flowchart showing a motor absorption torque operation.

FIG. 8 is used for computing an absorption torque (hereafter referred to as motor absorption torque) TOVRM of the motor/generator when the vehicle starts, and is performed at a fixed interval (e.g., 10 milliseconds).

First, in steps S41, S42, the aforesaid temporary stop permission flag FCOND and the immediately preceding value of this flag are read.

When FCOND=0 and the immediately preceding value FCOND=1, it is determined that the idle stop has been released, and the routine proceeds to a step S43.

Here, a timer is reset to ISPOFF=0, and an idle time injection pulse width TPIDL is input as an initial value of a target torque equivalent injection pulse width TTPIST. The timer ISPOFF is intended to measure the elapsed time from the idle stop release timing.

During the subsequent processing, the present and immediately preceding values of FCOND=0, so the routine proceeds from the steps S41, S42 to a step S45, and it is determined whether or not the control mode is MODE=06. As described later, MODE=06 when the engine has completed combustion after idle stop has been released, and until then, the routine proceeds to a step S46 and subsequent steps.

In the step S46, although not shown, the fuel basic injection pulse with TPO, cylinder air amount equivalent injection pulse width TP, weighted average coefficient FLOAD and engine rotation speed Ne computed by a flowchart for calculating the engine fuel injection amount, are read. Here, the method of performing these computations is shown in the above equations (1)–(3).

Figure 5:
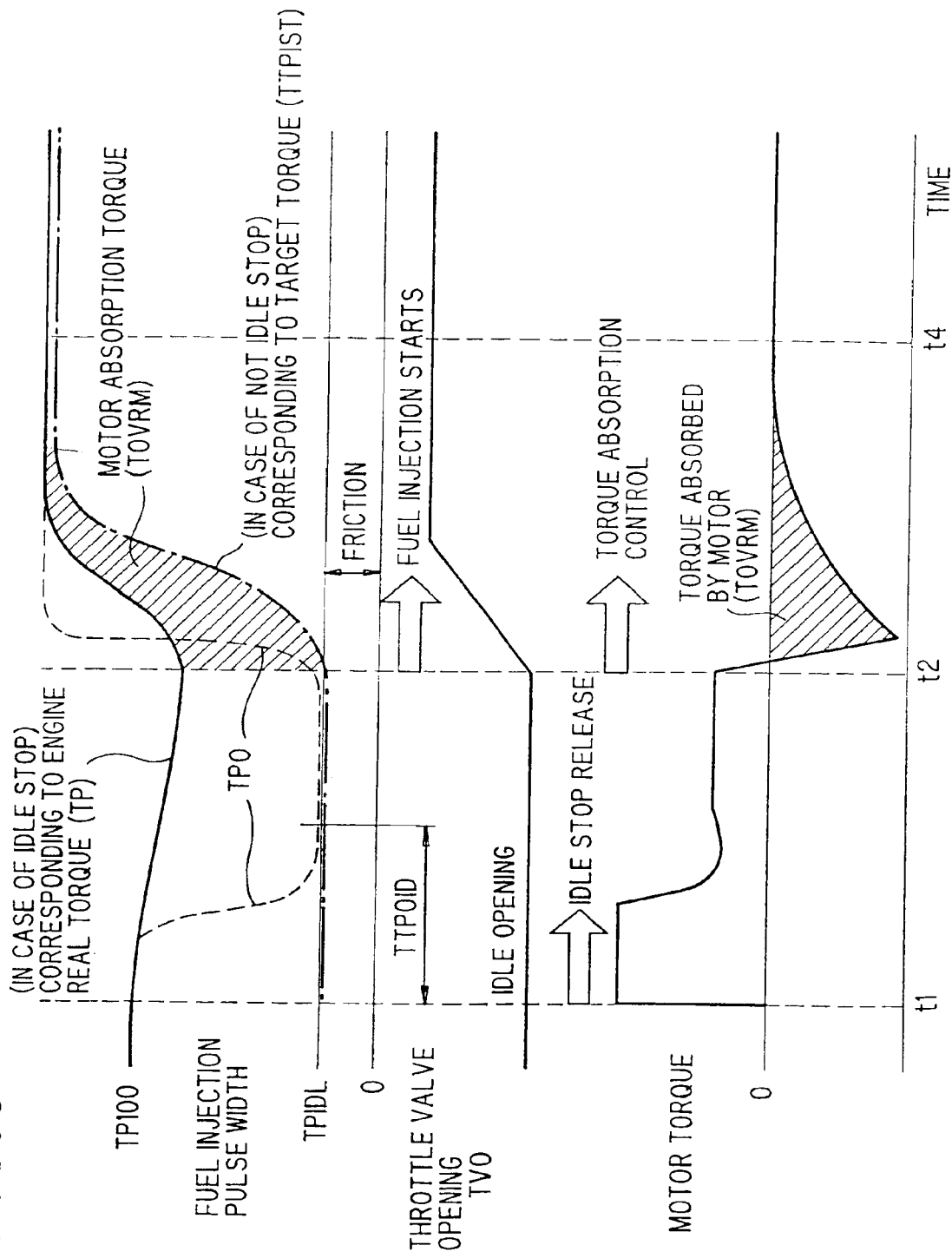
FIG. 5 is a waveform diagram describing a motor absorption torque.

During an idle stop, the intake air passage pressure downstream of the throttle valve is atmospheric, and after subsequent release of idle stop, when the engine has been started by the motor/generator 2, TPO falls sharply to TP100 and coincides with TPIDL, as shown in FIG. 5. This will be described later.

However, TP gradually falls with a first-order delay relative to TPO with TP100 as an initial value from a position where the value of FLOAD is determined.

Figure 9:
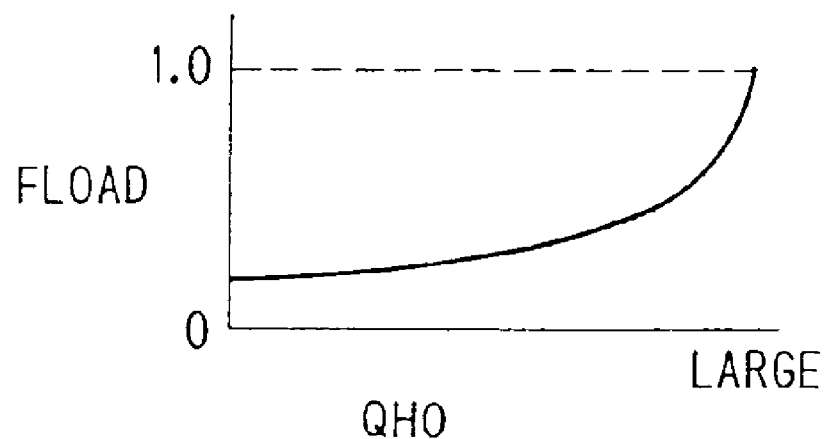
FIG. 9 is a characteristic diagram of a weighted average coefficient which is a time constant equivalent of a pipe air intake filling delay.

FLOAD, which represents the degree of first-order delay, is a value according to a volumetric flowrate ratio QH0 as shown in FIG. 9. This volumetric flowrate ratio QH0 is a value computed based on the throttle valve opening TVO and engine rotation speed Ne.

Figure 10:
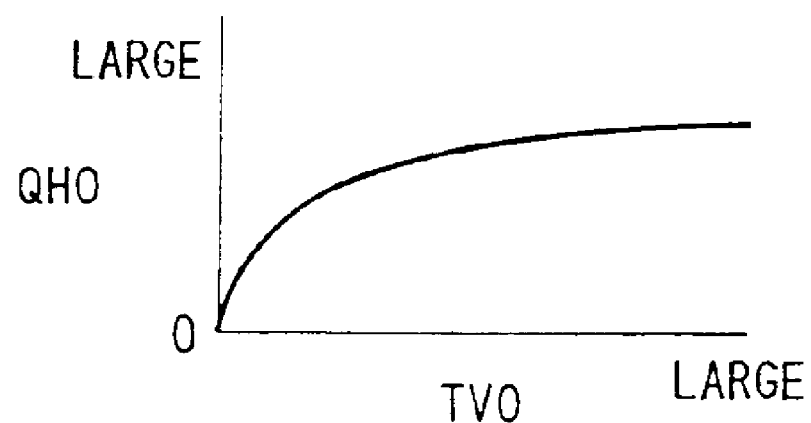
FIG. 10 is a characteristic diagram of a volumetric flow rate ratio.

Under conditions when the engine rotation speed is constant, for example, the value of the volumetric flowrate ratio QH0 increases the larger the throttle valve opening TVO, as shown in FIG. 10.

In a step S57, the timer ISPOFF is incremented. In a step S48, the value of this timer ISPOFF is compared with a predetermined value TTPOID.

This predetermined value TTPOID is a value which has a slight tolerance relative to a timing which effectively coincides with the injection pulse width TPIDL when TPO is idle (FIG. 5).

When the value of the timer ISPOFF is equal to or less than the predetermined value TTPOID, the injection pulse width TPIDL for idle running is selected, and when the timer ISPOFF exceeds the predetermined value TTPOID, TPO is selected (steps S49, S50).

Now, after idle stop is released, when the accelerator pedal is depressed, the cylinder air amount equivalent injection pulse width which appears later than TPO with TPIDL as initial value, is set as a target torque equivalent injection pulse width TPIST (FIG. 5). This may be expressed in the form of an equation as follows.

$$TTPIST = TPO \times FLOAD + TTPISTz \times (1 - FLOAD) \quad (4)$$

where:
FLOAD=weighted average coefficient
TTPISTz=immediately preceding value of TTPIST
initial value of TTPIST=TPIDL The weighted average coefficient FLOAD of equation (4) is the same as the weighted average coefficient of the above equation (2). Specifically, it is a value determined by the throttle valve opening TVO and engine rotation speed Ne. If the engine rotation speed is fixed, the value of FLOAD is small when TVO is small, and the value of FLOAD is large when TVO is large.

This corresponds to the target torque when the vehicle is started without performing an idle stop, and if this is the same as the torque when the vehicle is started from the idle stop state, the difference in vehicle starting characteristics can be eliminated.

Therefore, in a step S51, the target torque equivalent injection pulse width TTPIST for controlling the fuel injection amount, which is effectively identical to that of equation (4), is computed by the following equation.

$$TTPIST = TP1 \times FLOAD + TTPISTz \times (1 - FLOAD) \quad (5)$$

where FLOAD=weighted average coefficient
TTPISTz=immediately preceding value of TTPIST This equation is basically identical to equation (4). Equation (4) is applied from a timing t2 in FIG. 5, and equation (5) is applied up to a timing t1.

Figure 11:
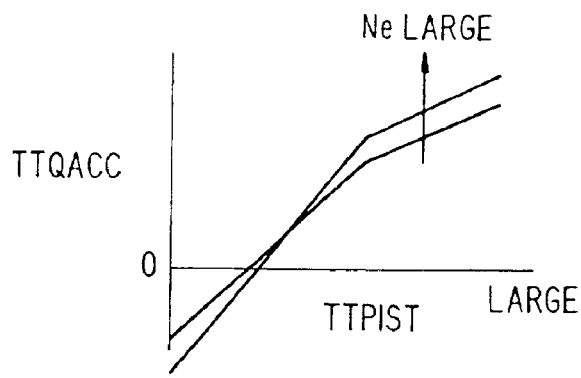
FIG. 11 is a characteristic diagram of a target torque.

In a step S52, a target torque TTQACC is computed by looking up a map shown in FIG. 11 from this target torque equivalent injection pulse width TTPIST and engine rotation speed Ne.

The characteristics of this target torque TTQACC will not be described in detail, but it is a value which increases the larger TTPIST is if Ne is constant, and increases the larger Ne is if TTIPST is constant.

Figure 12:
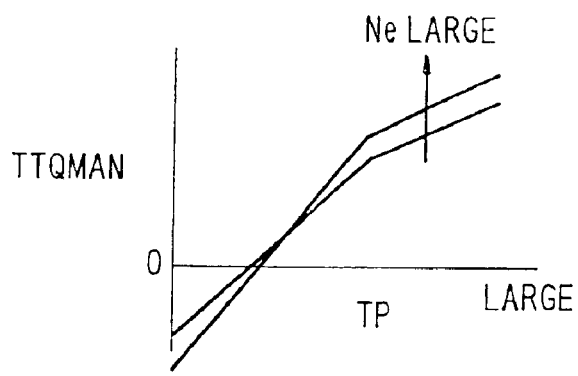
FIG. 12 is a characteristic diagram of a virtual torque.

In a step S53, a virtual torque TTQMAN of the engine is computed by looking up a map shown in FIG. 12 from the cylinder air amount equivalent injection pulse width TP and the engine rotation speed Ne.

The cylinder air amount equivalent injection pulse width T0 corresponds to the real intake air amount during the idle stop state of FIG. 5, and it is larger than the target torque equivalent injection pulse width TTPIST which generates the target torque.

Therefore, the virtual torque TTQMAN found from this TP and Ne is a value larger than the aforesaid target torque TTQACC.

The characteristics of this virtual torque TTQMAN vary according to the engine type, and therefore are determined for each engine to which it is to be applied.

In a step S54, the difference between the target torque TTQACC and virtual torque TTQMAN is computed as an overshoot torque basic value TOVRM0(=TTQACC−TTQMAN).

In a step S55, using this TOVRM0, a weighted average value TOVRM1 of the overshoot torque basic value is computed using the following equation.

$$TOVRM1 = TOVRM0 \times KTOVR + TOVRM1z \times (1 - KTOVR) \quad (6)$$

where KTOVR=weighted average coefficient
TOVRM1z=immediately preceding value of TOVRM1

TOVRM0 is a negative value, and TOVRM1 is also a negative value. The reason why a negative value was taken is to agree with the torque absorption (torque recovery) by the motor/generator 2. The initial value of TOVRM1 is a motor real torque TTEMB of the motor/generator 2. This is described in a step S74 of FIG. 14.

In a step S56, it is determined whether the control mode is MODE=09.

MODE=09 when a torque overshoot is determined, as described later (described in step S72 of FIG. 14).

When MODE=09, the routine proceeds to a step S57, the weighted average value TOVRM1 of the overshoot torque basic value is set to a motor absorption torque TOVRM, and at other times, as these are not torque control periods, the motor absorption torque TOVRM is set to 0 in a step S58.

Figure 14:
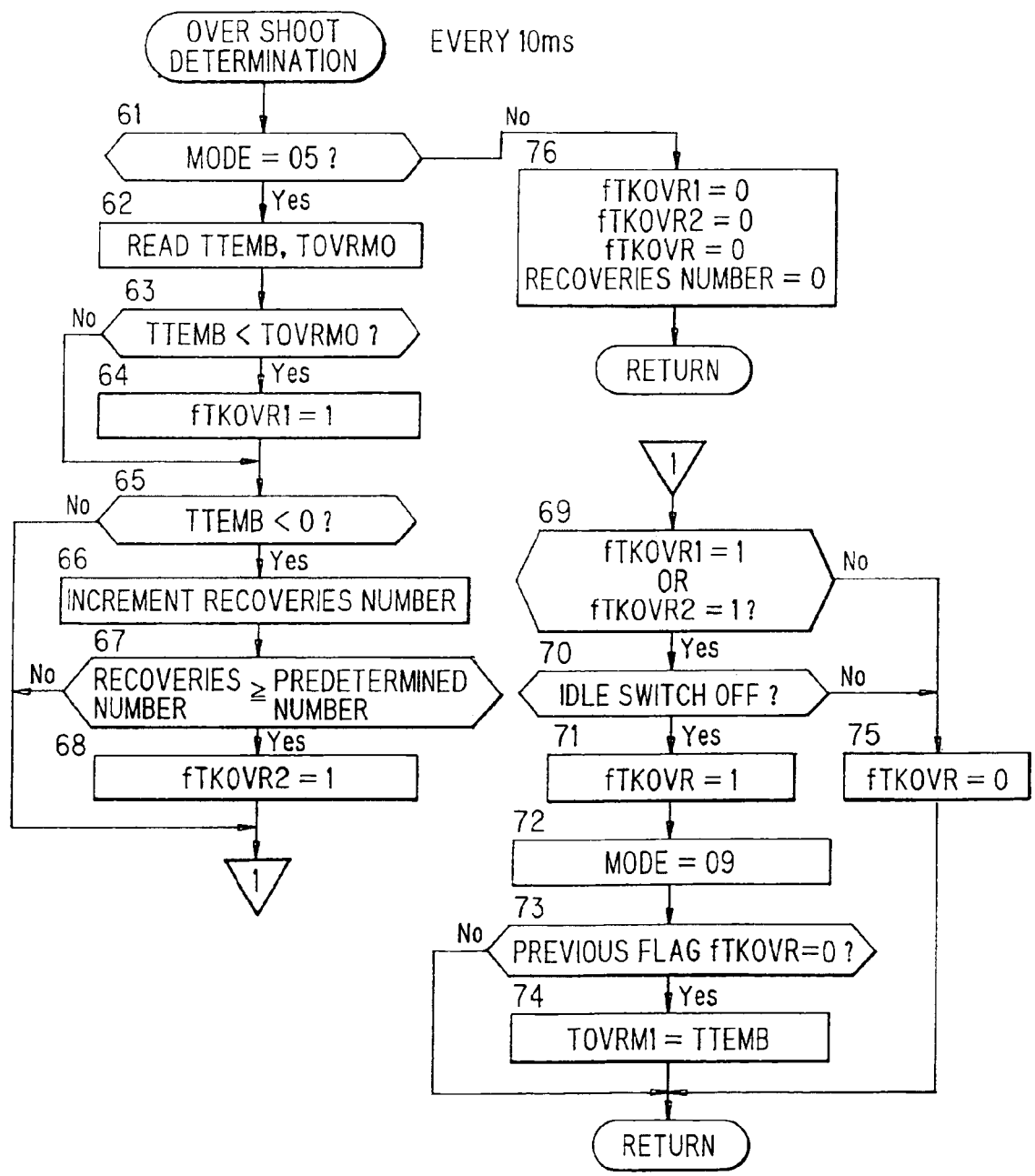
FIG. 14 is a flowchart showing a determination of an overshoot.
Figure 15:
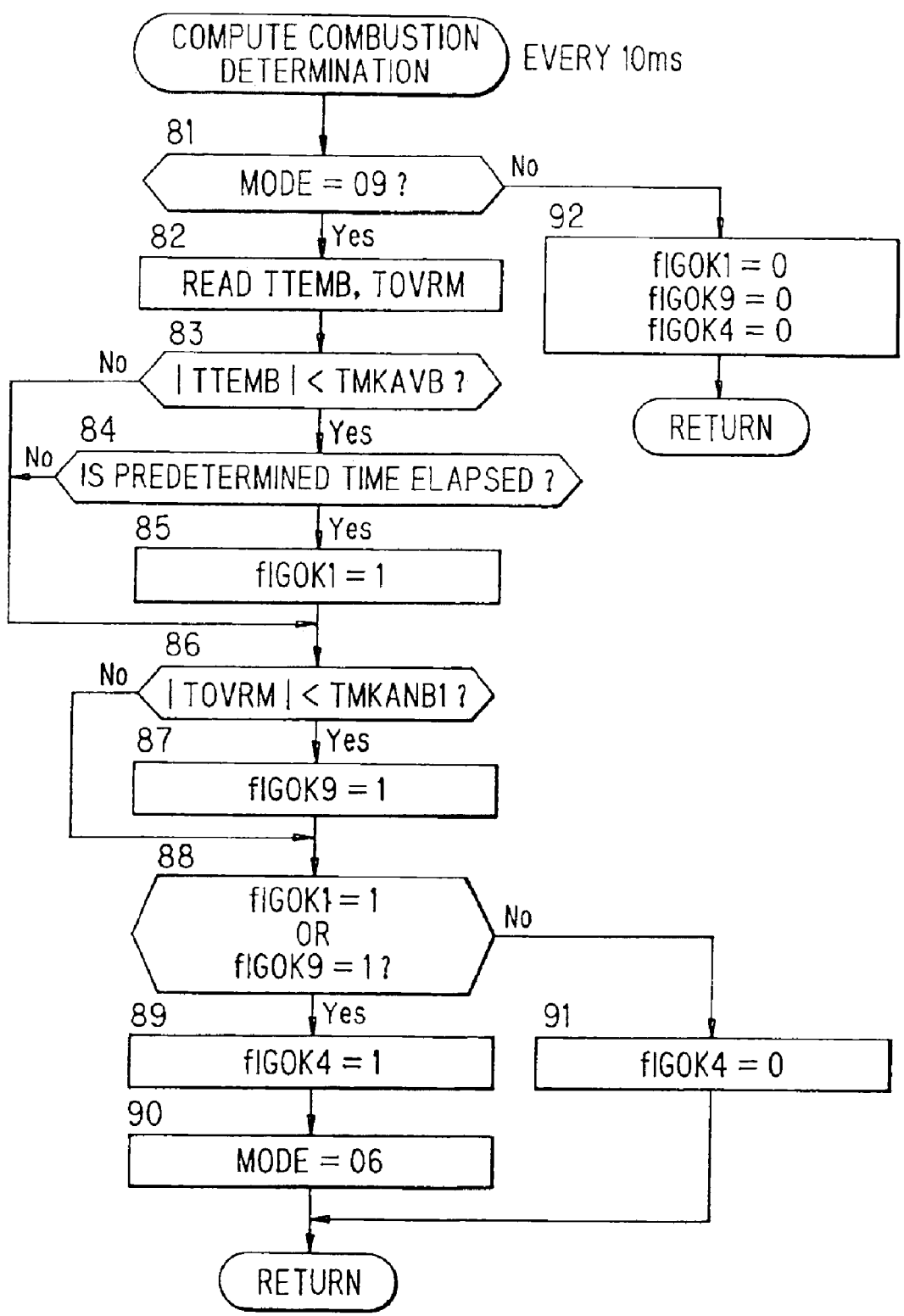
FIG. 15 is a flowchart showing a determination of total combustion.

The aforesaid overshoot torque basic value TOVRM0 is required in the flow for overshoot determination shown in FIG. 14, while the motor absorption torque TOVRM is required in the flow for determining complete combustion of the engine shown in FIG. 15. They are therefore stored in the memory (RAM) of the automatic stop/control unit 10.

The reason why the fuel injection pulse widths (TTPIST, TP) are respectively converted to engine torques (TTQMAN, TTQACC), and their difference is calculated as the overshoot torque basic value TOVRM0 (motor absorption torque) as described above, is because it is necessary to take account of engines susceptible to engine knock.

Figure 13:
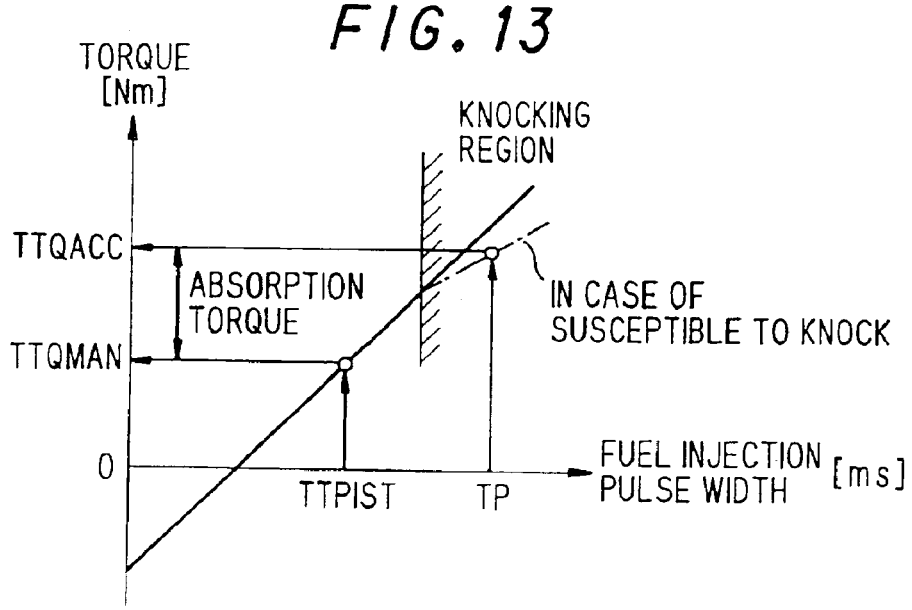
FIG. 13 is a characteristic diagram describing conversion of a fuel injection pulse width to an engine torque.

This will be described simply referring to FIG. 13.

In an engine resistant to knock, the relation between the fuel injection pulse width (fuel amount) and engine torque is linear (solid line), so there is no problem if the motor absorption torque is calculated by making it directly proportional to the difference of the two fuel injection pulse widths TTPIST, TP.

However, in an engine susceptible to knock, the relation between fuel amount and engine torque is non-linear (dot-and-dash line), so when TP is in the knock region, the regeneration torque cannot be calculated by making it directly proportional to the difference between the two fuel injection pulse widths TTIPST, TP. Therefore, in this case, TTPIST, TP are respectively converted to the torques TTQMAN, TTQACC, and the difference between these two converted torques is taken as the motor absorption torque. By doing this, even when TP is in the knock region, the motor absorption torque can be found to a high precision.

Next, the determination of overshoot will be described referring to the flowchart of FIG. 14.

In a step S61, it is determined whether or not the control mode MODE=05. Although not shown, the control mode MODE is set to 05 at a timing when the throttle valve opens after idle stop release (i.e., when the system shifts to vehicle start).

When MODE=05, the routine proceeds to a step S62, the motor real torque TTEMB and overshoot torque basic value TOVRM0 are read, and these two values are compared in a step S63.

The motor real torque TTEMB is computed based on the current flowing through the motor/generator 2, and the voltage.

Initially, when MODE=05, as described later, the motor real torque TTEMB is larger than the overshoot torque basic value TOVRM0, as shown in FIG. 7(a). Therefore, the routine skips a step S64, but when the motor real torque eventually becomes less than the overshoot torque basic value TOVRM0, the routine proceeds to the step S64, it is determined that the system has overshot, and a flag fTKOVR1 is set to 1.

In a step S65, the motor real torque TTEMB is compared with 0. As shown in FIG. 7(b), initially, when MODE=05, the motor real torque TTEMB is a positive value, and then tends towards a negative value.

When the motor real torque TTEMB is negative (less than 0), the routine proceeds to a step S66, and the number of recoveries(number of torque absorption) due to the motor/generator 2 is incremented by 1. Subsequently, in a step S67, this number of recoveries is compared with a predetermined number (e.g., 4).

On the first occasion when the motor real torque TTEMB becomes negative, a step S68 is skipped as the above number of recoveries is 1, but when TTEMB<0 is satisfied and this number increases even in the next computation (in FIG. 7(b), corresponds to a number with a *), and the number eventually becomes equal to the predetermined number, the routine proceeds to a step S68 and another flag fTKOVR2 is set to 1.

In a step S69, it is determined whether or not one of the flags fTKOVR1, fTKOVR2 is 1, and in a step S70, it is determined whether or not an idle switch, not shown, is OFF.

When both of the flags fTKOVR1, fTKOVR2 is 1, and the idle switch is OFF (accelerator pedal is depressed), the routine proceeds to step S71, S72.

Here, the overshoot flag fTKOVR1 is set to 1, and MODE is set to 09 to advance to the next control mode.

At other times, the routine proceeds to a step S75 from the steps S69, S70, and the overshoot flag fTKOVR is set to 0.

When the idle switch is ON even when the two flags fTKOVR1, fTKOVR2 are both 1, an overshoot determination is not performed.

This is because the torque control due to the motor/generator 2 is performed when the throttle valve opens according to the accelerator pedal depression amount after idle stop is released, and there is no need to perform torque control when the throttle valve is not open (idle switch is ON).

When the overshoot flag fTKOVR is changing over from 0 to 1, the routine proceeds from a step S73 to a step S74, and the motor real torque TTEMB is set to the weighted average value TOVRM1 of the overshoot torque basic value as an initial value.

On the other hand, when MODE is not 05 in the step S61, the routine proceeds to a step S76, the two flags fTKOVR1, fTKOVR2 and overshoot flag fTKOVR are reset to 0, and the number of recoveries is reset to 0.

MODE=09 is stored in the memory (RAM) of the automatic stop/start control unit 10.

Next, reference will be made to the flowchart of FIG. 15 for determining complete combustion after engine startup.

Figure 16:
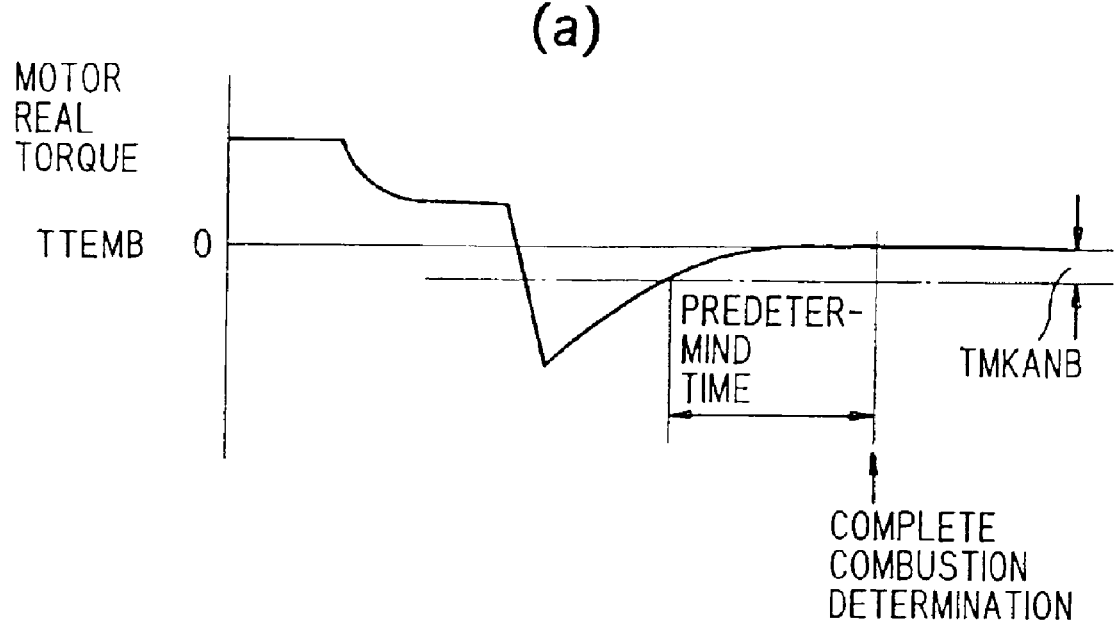
FIGS. 16(a) and (b) are waveform charts for describing a method of determining total combustion.
Figure 16:
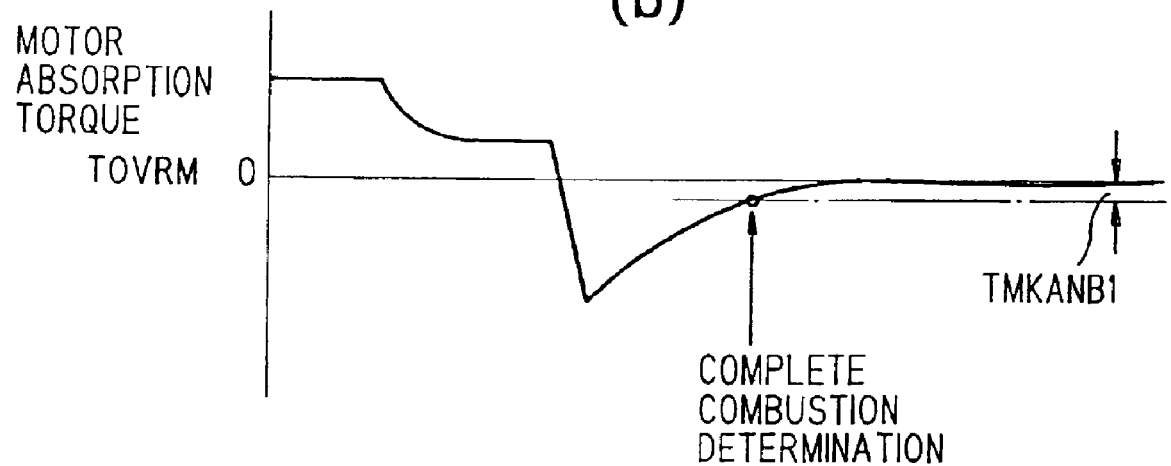

Before describing this, the essential features of the determination of complete engine combustion will be described using FIG. 16. FIG. 16(a) shows the variation of the motor real torque TTEMB, and FIG. 16(b) shows the variation of motor absorption torque (i.e., torque absorbed as a generator) in model form.

First, in a first complete combustion determining method based on the motor real torque shown in FIG. 16(a), |vTTEMB| which is the absolute value of the motor real torque TTEMB is compared with a determining value TMKANB (positive value), and if the relation between the two is |TTEMB|<TMKANB, it is determined that the engine has performed complete combustion after a predetermined time has elapsed.

The reason for determining that complete combustion was performed after the predetermined time elapsed, is that the motor real torque TTEMB is unsteady due to the effect of vibration, and the determination of whether or not |TTEMB|<TMKANB is vague. For the same reason, the determining value TMKANB is set large.

On the other hand, in a second complete combustion determining method based on the motor absorption torque shown in FIG. 16(b), |TOVRM| which is the absolute value of the motor absorption torque TOVRM is compared with a determining value TMKANB1 (positive value), and when |TOVRM|<TMKANB1, it is determined that complete combustion has been performed.

The reason why there is no need to wait for a predetermined time in this case is that, as the motor absorption torque TOVRM is a target value, the result is not affected by vibration. Therefore, in this case, the determining value TMKANB1 can be set less than the above determining value TMKANB, and the timing of the determination is earlier than that of the first complete combustion determining method.

In the embodiment, both determining methods are used, and the earlier of the complete combustion timings is adopted.

Next, FIG. 15 will be described.

In a step S81, it is determined whether or not MODE=09.

When MODE=09 (torque control is being performed), the routine proceeds to a step S82, and the motor real torque TTEMB and motor absorption torque TOVRM are read.

In a step S83, the absolute value of the motor real torque TTEMB is compared with the determining value TMKANB (positive value). If |TTEMB|<TMKLANB, the routine proceeds to a step S84, and if this state, i.e., the state |TTEMB|<TMKANB continues for a predetermined time, the routine proceeds to a step S85 and a flag flGOK1 is set to 1.

In a step S86, the absolute value of the motor absorption torque TOVRM is compared with the determining value TMKANB1 (positive value). If |TOVRM|<TMKANB1, the routine proceeds to a step S87, and another flag flGOK9 is set to 1.

In a step S88, the two flags flGOK1, flGOK9 are examined, and if both of them are 1, the routine proceeds to steps S89, S90 to terminate torque control. Herein, a complete combustion flag flGOK4 is set to 1, and the control mode MODE is set to 06.

On the other hand, if the flags are not 1 in the step S88, the complete combustion flag flGOK4 is set to 0 in a step S91.

When MODE is not 09, there is no need to perform the complete combustion determination, the routine proceeds from the step S81 to the step S92, and the two flags flGOK1, flGOK9, together with the complete combustion flag flGOK, are reset to 0.

The above MODE=06 is stored in a memory (RAM) of the automatic stop/start control unit 10.

Next, the situation will be described where, according to this invention, the accelerator pedal is depressed and the vehicle starts after idle stop is released, as compared with the case where the vehicle starts from the state where there is no idle stop, by referring to FIG. 5 and FIG. 6.

In FIG. 5, it will be assumed that when the vehicle is stationary and there is no idle stop (the engine does not stop), the engine is an idle rotation state, and the accelerator pedal is then depressed by a certain depression amount at the timing t2. Due to this, the throttle valve 27 opens to a certain opening, and the basic injection pulse width TPO increases sharply from the injection pulse width TPIDL in the idle state (dotted line) so as to immediately control the fuel injection amount corresponding to the variation of intake air amount passing through the throttle valve 27.

This is because TPO is a directly proportional value to the intake air amount Qa detected by the air flow meter 24, and when the throttle valve 27 opens, the intake air amount passing through it is detected by the air flow meter 24 which is situated immediately upstream of the throttle valve 27.

On the other hand, the cylinder air amount equivalent injection pulse width increases gradually (dot-and-dash line) after TPO which increases sharply.

When idle stop is not performed, due to idle rotation, the engine boost is large, and a delay appears in the variation of the air amount actually taken into the cylinder even if the throttle valve 27 is open. Therefore, the pulse width which determines the fuel injection amount is computed, taking the cylinder air amount equivalent injection pulse with TPIDL as an initial value, such that the cylinder air amount equivalent injection pulse width appears later than the variation of TPO. The engine torque is generated correspondingly. This engine torque corresponds to the target torque TTPIST when the vehicle starts from the idle stop state described later.

Now, assume that an idle stop state is performed when the vehicle is stationary, and in this stop state, idle stop is released at the timing t1. Assume that subsequently, the accelerator pedal is depressed and the vehicle begins to move off at the timing t2.

When idle stop is performed, during this interval, the pressure in the intake air passage downstream of the throttle valve 27 becomes atmospheric. Therefore, the engine 1 is rotated and driven by the motor/generator 2 from this state, and fuel is then injected to produce the torque of the engine 1, but as the boost of the intake air system is small, the real air amount aspirated by the engine 1 is large, and the engine torque is larger than when the vehicle starts from idle rotation state as described above.

The control of fuel injection amount at this time is performed as follows.

The engine 1 is rotated by the motor/generator 2, and air is aspirated by the engine 1. Consequently, the basic injection pulse width TPO which is directly proportional to the intake air amount falls sharply to coincide with TPIDL (dotted line).

However, the cylinder air amount equivalent injection pulse width TP which is a value obtained by smoothing TPO by FLOAD, varies with a value of TP100, which is the cylinder air amount equivalent injection pulse width when the throttle valve is fully open, as an initial value. Therefore, it gradually decreases after TPO, and increases again corresponding to the opening of the throttle valve 27 from the timing t2 (solid line).

The reason why TP decreases only slowly during the interval t1–t2 is that during the interval t1–t2, the throttle valve opening TVO is a small value (throttle valve is in the idle position or a position near to this), so the value of FLOAD is small, and TP moves only slowly.

In this case, fuel injection is not performed before t2, and engine torque is not produced. However, when fuel injection begins at the timing t2, a large engine torque corresponding to TP is produced.

Hence, to make the engine torque produced at this time coincide with the torque when the vehicle starts from idle rotation, i.e., the engine torque produced according to TTPIST, part of the engine torque is absorbed by the motor/generator 2.

In other words, the torque which represents the difference between TP and TTPIST (shaded part) is an unnecessary torque, so control is performed such that this torque is absorbed by the motor/generator 2.

Specifically, the torque obtained by subtracting the engine torque produced according to TP (virtual torque) from the engine torque produced according to TTPIST (target torque), is calculated as the motor absorption torque TOVRM (negative value), and torque control is performed to obtain this regeneration torque TOVRM.

The control performed by the motor/generator 2 will now be described in detail.

When idle stop is released, rotation speed control is performed to maintain idle rotation by the motor/generator 2 from this timing. Subsequently, when the accelerator pedal is depressed, the motor/generator 2 shifts to torque control to perform the above torque absorption.

Figure 6:
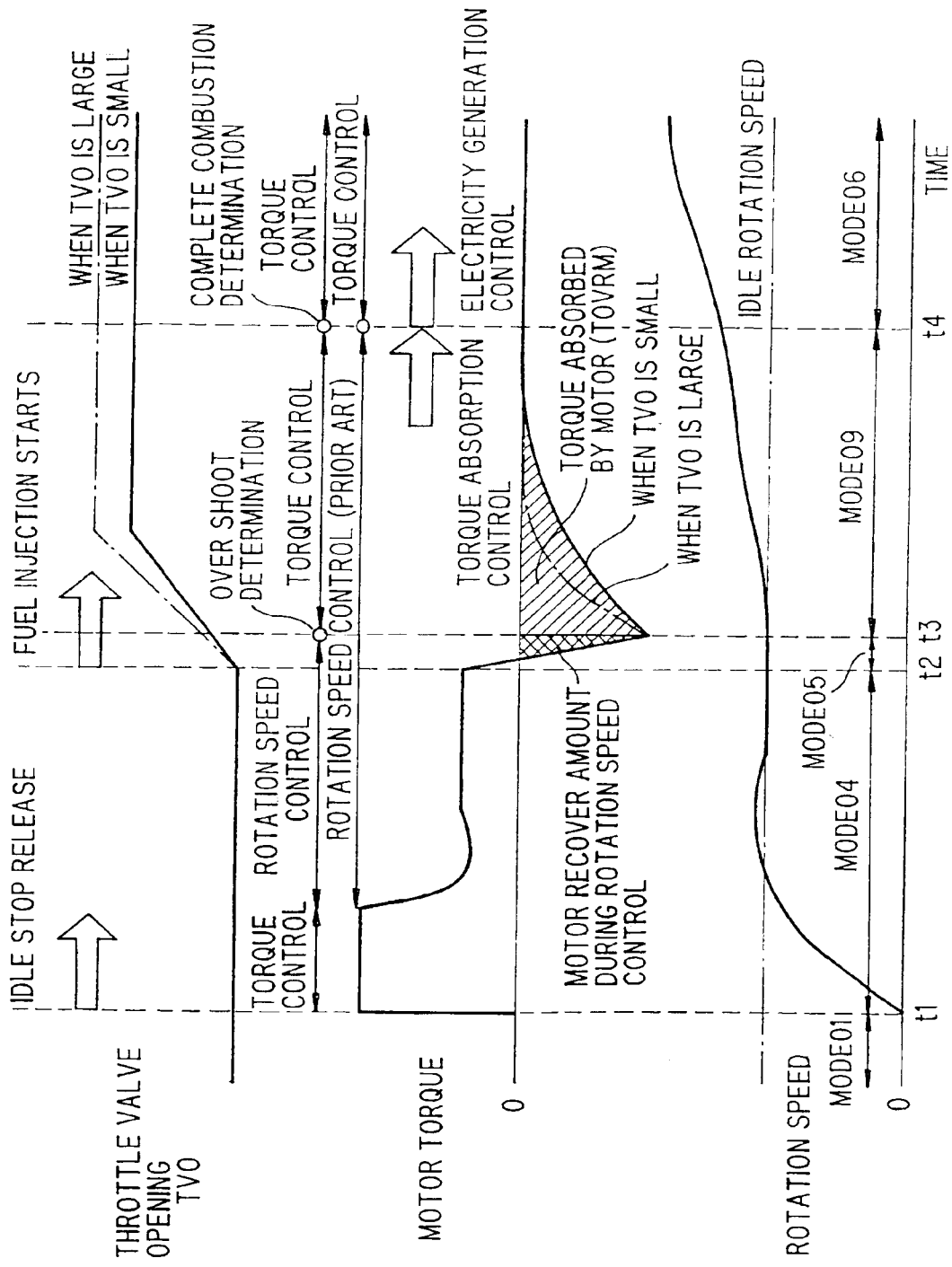
FIG. 6 is a waveform diagram describing a period in which torque control is performed.

There is a change-over from rotation speed control to torque control of the motor/generator 2 when an overshoot is determined, as shown in FIG. 6.

Immediately after a large engine torque is produced based on the above TP from the start of fuel injection at the timing t2, the engine rotation speed starts to rise, so the motor torque required to maintain the target rotation speed (=idle rotation speed) decreases sharply (overshoots) from the timing t2 due to rotation speed control.

As a result, an overshoot is determined based on the motor torque (motor real torque), and once an overshoot is determined, there is a change-over to torque absorption control by the motor/generator 2 at a timing t3.

Figure 7:
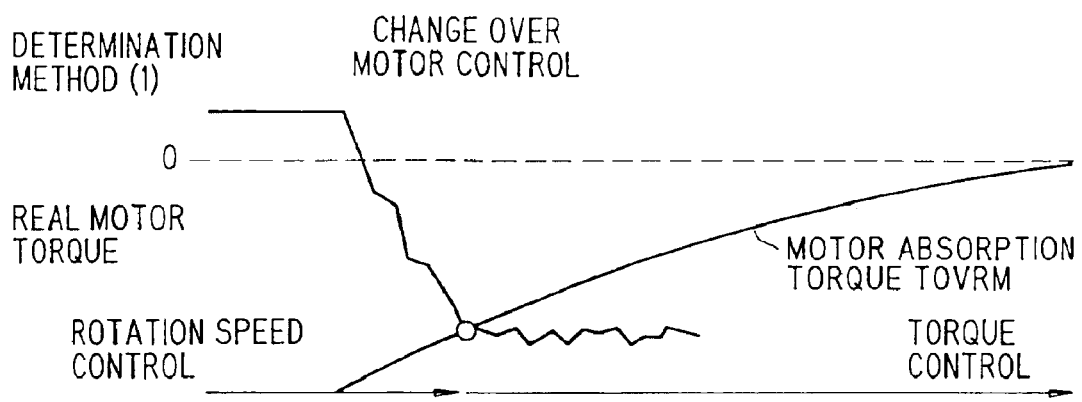
FIGS. 7(a) and (b) are waveform diagrams describing determination of an overshoot.
Figure 7:
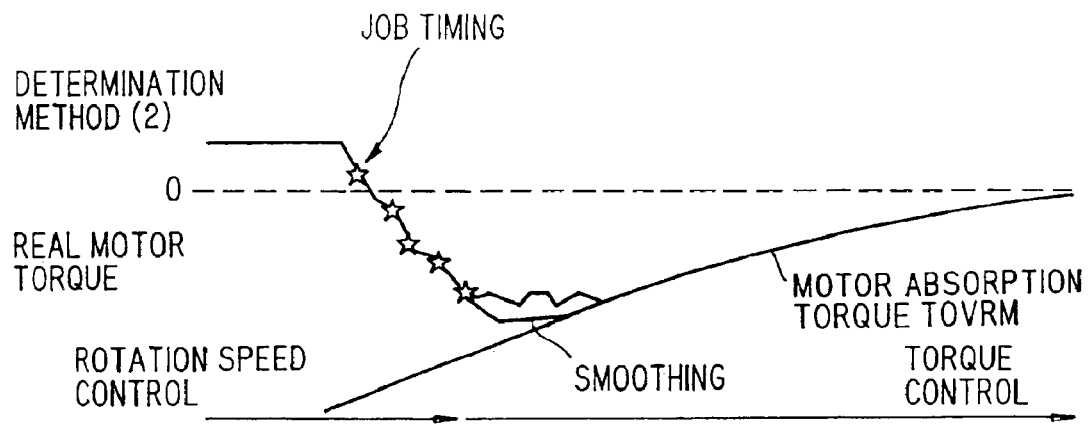

The determination of overshoot will be described in more detail referring to FIG. 7.

In this example, two determination methods are combined. In the first determination method, it is determined that an overshoot has occurred when the motor real torque during rotation speed control is less than the motor absorption torque (absorption torque) TOVRM, as shown in FIG. 7(a).

In the second determination method, it is determined that an overshoot has occurred when several motor recoveries (four in the figure) have been performed after the motor real torque has become a negative value during rotation speed control, as shown in FIG. 7(b). The change-over to torque control occurs at whichever timing, as determined by the two methods, is the earlier.

According to the second determination method, the change-over to torque control can be made before the torque has fallen below the motor absorption torque TOVRM, as shown in the figure. In this case, the vehicle can be started without a delay, but it is necessary to ensure that there is no gap (e.g., by inserting dummy processing) between the motor torque immediately prior to change-over to torque control and the motor torque immediately after change-over.

Subsequently, in FIG. 6, at a timing t4 when it is determined that the engine has performed complete combustion, the torque control by the motor/generator 2 is terminated, and there is a return to ordinary torque control. Control modes MODE with different numbers are shown at the bottom of the figure, and control is performed for each mode according to the number indicated by the control mode MODE.

In ordinary torque control by the motor/generator 2, the motor/generator 2 is made to function as a generator to recover deceleration energy when the vehicle is decelerating, for example, or made to function as a motor to augment the torque of the engine 1 during rapid acceleration, etc.

As described above, according to this invention, the engine torque corresponding to the actual difference in the cylinder air amount when the vehicle starts from the idle stop state is absorbed by the motor/generator 2 and the starting torque of the vehicle is decreased, so the vehicle can be effectively given an identical starting performance.

This may be applied in the same way even if the vehicle is traveling at high altitude where air pressure (air density) is low.

The cylinder air amount equivalent injection pulse width TTPIST when the accelerator pedal is depressed to start the vehicle, and the basic injection pulse width TPO computed taking the idle equivalent injection pulse with TPIDL as an initial value based on the air flow meter output, are respectively computed as values smoothed by weighted average coefficients, and a weighted average coefficient FLOAD corresponding to the time constant of the filling delay of the intake air pipe is used as a weighted average coefficient. Hence, combustion can be performed at the stoichiometric air-fuel ratio determined by the basic injection amount when the vehicle starts from the engine stop state, and there is no impairment of the conversion efficiency of the three-way catalyst.

The weighted average coefficient FLOAD which corresponds to the time constant of the filling delay of the intake air pipe is a value depending on the throttle valve opening TVO, so the idle rotation speed increases more sharply when the throttle valve 27 is opened wide (dot-and-dash line in FIG. 6) than when the throttle valve is opened a little (solid line in FIG. 6), and a starting performance in accordance with the throttle opening (accelerator pedal depression amount) is obtained.

The change-over to torque control was made at a timing when the motor real torque TTEMB during rotation speed control by the motor/generator 2, fell below the overshoot torque basic value TOVRM0, so the torques before and after the change-over from rotation speed control to torque control can be smoothly linked.

If the motor/generator 2 changes over from rotation speed control to torque control after several recoveries have occurred, the change-over to torque control can be made even before the motor real torque TTEMB during rotation speed control falls below the overshoot torque basic value TOVRM0, so the vehicle can be started without any delay.

Further, the torque corresponding to the difference of the two cylinder air amount equivalent injection pulse widths TTPIST, TP, is computed after TTPIST, TP are converted to engine torques separately, so the recovered torque can be given with high precision even in an engine susceptible to knock where the relation between the cylinder air amount equivalent injection pulse width and engine torque is not linear.

In the above description, the engine torque corresponding to the difference between the cylinder air amount equivalent injection pulse width TP when the accelerator pedal is depressed to start the vehicle after idle stop is released, and the cylinder air amount equivalent injection pulse width TTPIST when the accelerator pedal is depressed to start the vehicle, was absorbed by the motor/generator 2, but an engine torque corresponding to the difference between the cylinder air amount when the vehicle starts after idle stop state is released and the cylinder air amount when the vehicle starts from the idle rotation state, may also be absorbed by the motor/generator 2.

The entire content of Japanese Patent Application 2000-110424 (filed Apr. 12, 2000) is incorporated herein by reference.

This invention is not limited to the above embodiment, various modifications being possible by those skilled in the art within the scope of the appended claims.

INDUSTRIAL APPLICABILITY

This invention applies to idle stop control of a vehicle, wherein starting performance after idle stop release is controlled to be identical to starting performance when idle stop is not performed, and starting performance without discomfort is thereby ensured.

What is claimed is:

1. An engine idle stop control system for a vehicle, comprising:
    an engine,
    a motor/generator connected to the engine,
    an automatic transmission which transmits a rotation of the engine to a drive wheel,
    a sensor which detects a vehicle stationary state,
    a sensor which detects an accelerator pedal depression amount, and
    a microprocessor which is programmed to:
        stop the engine according to conditions when the vehicle has been stationary,
        restart the engine by starting the motor/generator when a request to restart the engine which has stopped is determined, and
        control absorption of the engine torque by the motor/generator so that a vehicle starting torque according to the same accelerator pedal depression is effectively the same torque for the vehicle starting from an engine stop state by restarting the engine as for the vehicle starting from an engine idle rotation state.

2. An engine idle stop control system for a vehicle as defined in claim 1, wherein:
    the torque absorbed by the motor/generator is set to correspond to the engine torque produced according to a difference between a real air volume aspirated by the engine when the vehicle starts from the engine stop state, and the real air volume aspirated by the engine when the vehicle starts from the engine idle state.

3. An engine idle stop control system for a vehicle as defined in claim 2, wherein:
    the real air volume absorbed by the engine according to the accelerator pedal depression amount when the vehicle starts from the engine stop state is calculated by smoothing an initial value of an air volume equivalent signal, calculated when a throttle is fully open, according to a time until the accelerator is depressed after the engine starts depending on an air flow meter output and a response delay of an intake air system.

4. An engine idle stop control system for a vehicle as defined in claim 2, wherein:
    the real air volume aspirated by the engine according to the accelerator pedal depression amount when the vehicle starts from the engine idle rotation state is calculated by smoothing an initial value of an air volume equivalent signal, calculated when a throttle is closed, according to a time depending on the air flow meter output and a response delay of an intake air system.

5. An engine idle stop control system for a vehicle as defined in claim 2, wherein:

a fuel injection amount is controlled according to the real air volume aspirated by the engine.

6. An engine idle stop control system for a vehicle as defined in claim 2, wherein:

the motor/generator shifts to absorption torque control by the generator when the motor torque for starting the engine becomes smaller than the absorbed engine torque corresponding to the difference of the aforesaid two real air volumes.

7. An engine idle stop control system for a vehicle as defined in claim 6, wherein:

the absorption torque control of the motor/generator continues until complete combustion of the engine is determined.

8. An engine idle stop control system for a vehicle, comprising:

an engine, a motor/generator connected to the engine, an automatic transmission which transmits a rotation of the engine to a drive wheel, means for detecting a vehicle stationary state, means for detecting an accelerator pedal depression amount, means for stopping the engine according to conditions when the vehicle has been stationary, means for restarting the engine by starting the motor/generator when a request to restart the engine which has stopped, is determined, and means for controlling to make the motor/generator absorb engine torque so that the vehicle starting torque according to the same accelerator pedal depression is effectively the same torque for the vehicle starting from an engine stop state by restarting the engine as for the vehicle starting from an engine idle rotation state.

* * * * *